United States Patent [19]

Watanabe et al.

[11] 4,052,670
[45] Oct. 4, 1977

[54] SPACE DIVERSITY SYSTEM IN PCM-TDMA TELECOMMUNICATION SYSTEM USING STATIONARY COMMUNICATION SATELLITE

[75] Inventors: Tatsuo Watanabe, Mitaka; Hideki Saito, Tachikawa; Akira Ogawa, Machida; Masahisa Yamaguchi, deceased, late of Tokyo, Japan, by Kazuko Yamaguchi, administrator and legal representative

[73] Assignee: Kokusai Denshin Denwa Kabushiki Kaisha, Japan

[21] Appl. No.: 643,708

[22] Filed: Dec. 23, 1975

[30] Foreign Application Priority Data

Dec. 24, 1974 Japan .................................. 49-147601
Dec. 24, 1974 Japan .................................. 49-147602

[51] Int. Cl.² .............................................. H04B 7/20
[52] U.S. Cl. .......................................... 325/4; 325/56; 325/302; 178/69.1; 179/15 BS
[58] Field of Search .................. 325/2, 4, 5, 6, 58, 325/56, 301, 302, 303, 304, 305, 306; 178/69.5 R; 179/15 BS

[56] References Cited

U.S. PATENT DOCUMENTS

| 3,145,341 | 8/1964 | Andrew | 325/302 |
| 3,428,898 | 2/1969 | Jacobsen et al. | 325/4 |
| 3,611,435 | 10/1971 | Cooper | 325/4 |
| 3,828,777 | 8/1974 | Muratani et al. | 325/56 |

Primary Examiner—Robert L. Griffin
Assistant Examiner—Tommy P. Chin
Attorney, Agent, or Firm—Robert E. Burns; Emmanuel J. Lobato; Bruce L. Adams

[57] ABSTRACT

A space diversity PCM-TDMA telecommunication system using a stationary communication satellite, in which fixed delay circuits are respectively inserted in the sending side and the receiving side of one route at a control equipment, while variable delay circuits are inserted in the sending side and the receiving side of the other route at the control equipment, so that electrical length of one route from the satellite to the control equipment may be the same as that of the other route from the satellite to the control equipment through the route including connection links between the two sites. Diversity switching can be performed with no duplication and lack of signals in accordance with the above construction.

3 Claims, 9 Drawing Figures

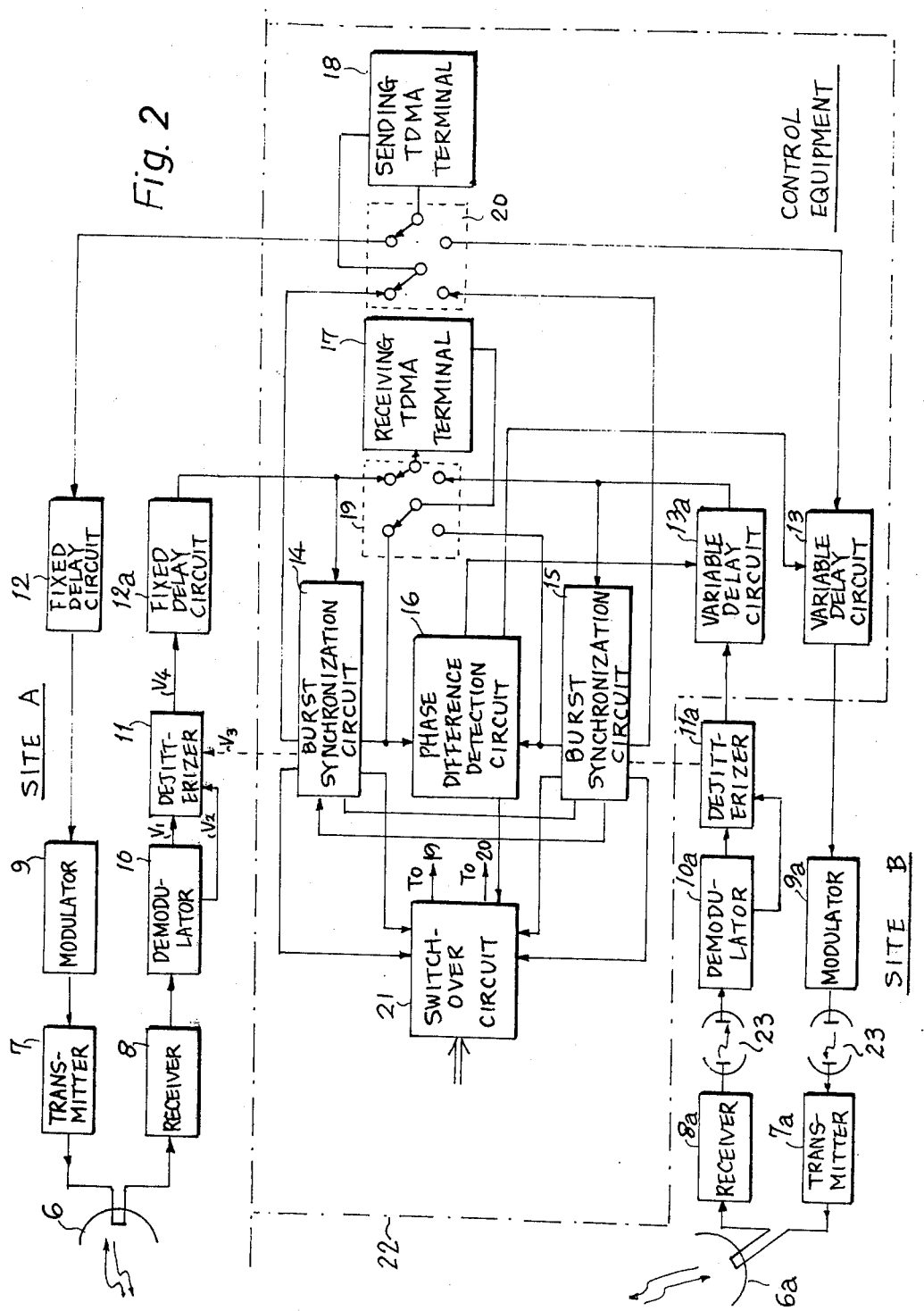

| J | K | C | $Q_{n+1}$ |
|---|---|---|---|
| 1 | 0 | 1 | 0 |
| 0 | 1 | 1 | 1 |
| φ | φ | 0 | $Q_n$ |

SPACE DIVERSITY SYSTEM IN PCM-TDMA TELECOMMUNICATION SYSTEM USING STATIONARY COMMUNICATION SATELLITE

FIELD OF THE INVENTION

This invention relates to a system of switching the signal transmission-reception routes for performing space diversity in a PCM-TDMA telecommunication system utilizing a communication satellite.

In satellite communcations, frequency bands less than 10 GHz have so far been mainly used, in which the attenuation of wave strength due to rain is rather small, and a single receiver system is sufficiently reliable for practical use. With increasing telecommunication demands in recent years, however, frequency bands of above 10 GHz have begun to be employed. In such a high frequency range, wave strength is much damped by rain. Accordingly, the sending signals and the receiving signals are much attenuated by it, so that it becomes impossible to maintain good conditions of the communication circuit. To overcome this problem, a space diversity system utilizing the localization of raining is conceivable. As a heavy rain tends to concentrate on a rather narrow zone, a good diversity effect can be expected by setting up two sites forming a space diversity system more than 10 km away from each other. Besides a usual telecommunication route through a communication satellite, for instance, another route is further provided via the same satellite, and when conditions of the usual route are deteriorated by raining, the signal transmission-reception operation can be taken over by switchover to the other site, which usually serves only as a signal receiving site. But, it should be particularly noted in effecting this switchover that, because the two sites are spaced more than 10 km from each other, and because distances between the communication satellite and these sites are always and extrenely gradually varying, due to the movement of the former, synchronization of the sending signal burst and the receiving signal burst is subject to disturbance, whereby lack and duplication of information occur. In the PCM-TDMA telecommunication system, a sending burst from the same station must be within a preassigned time slot in each frame. We call this "transmitting burst synchronization". If the sending operation is not performed in a pressigned time slot, the sending burst would overlap on those from other stations, thereby crippling the function of TDMA telecommunication. Switching of the routs under accurate transmitting burst synchronization is thus a most important problem.

BRIEF SAMMARY OF THE INVENTION

An object of this invention is to provide a space diversity system by simple and reliable control means.

In the present invention, fixed delay circuits are respectively inserted in the sending side and the receiving side of one route at a control equipment while variable delay circuits are inserted in the sending side and the receiving side of the other route at the control equipment, so that electrical length of one route from the satellite to the control equipment may be the same as that of the other route from the satellite to the control equipment through the other site B including connection links between the two sites. As the result, a signal sent from the control equipment will always reach the satellite through the site A or B in a equal time, and transmitting burst synchronization does not collapse by the route switchover. It is also just the same to the signal receiving side, where the same signal is concurrently received by the sites A and B at the time of route changeover, and no duplication or lack of signals takes place by it. It is, therefore, possible to establish the diversity quite simply in both of signal sending and reception.

BRIEF DESCRIPTION OF THE DRAWINGS

The principle, construction and operation of this invention will be clearly understood from the following description taken in conjunction with the accompanying drawings, in which:

FIG. 2 is a block diagram showing an embodiment of this invention;

DETAILED DESCRIPTION OF THE INVENTION

Figure 1A:
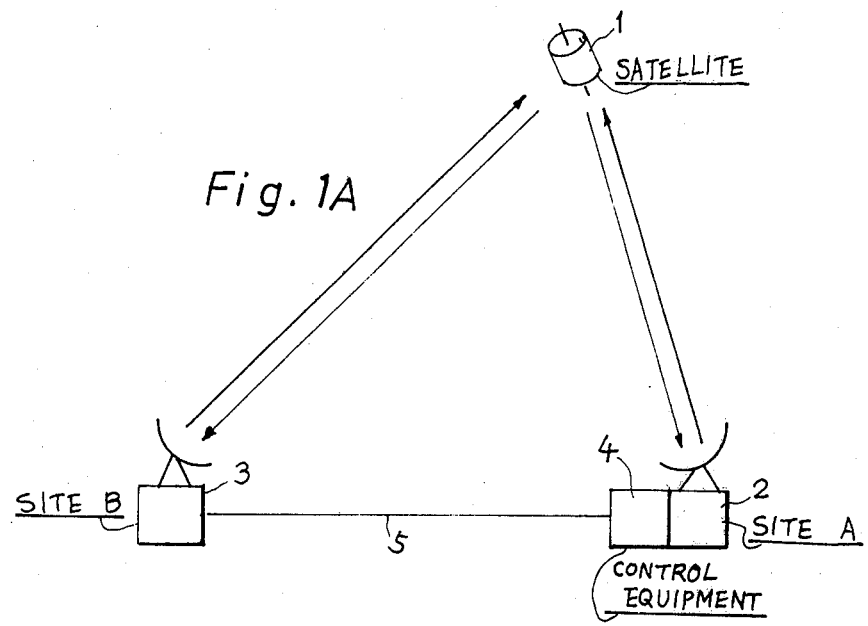
FIGS. 1A and 1B are each a schematic structure of a diversity system using a communication satellite to which this invention is applied.
Figure 1B:
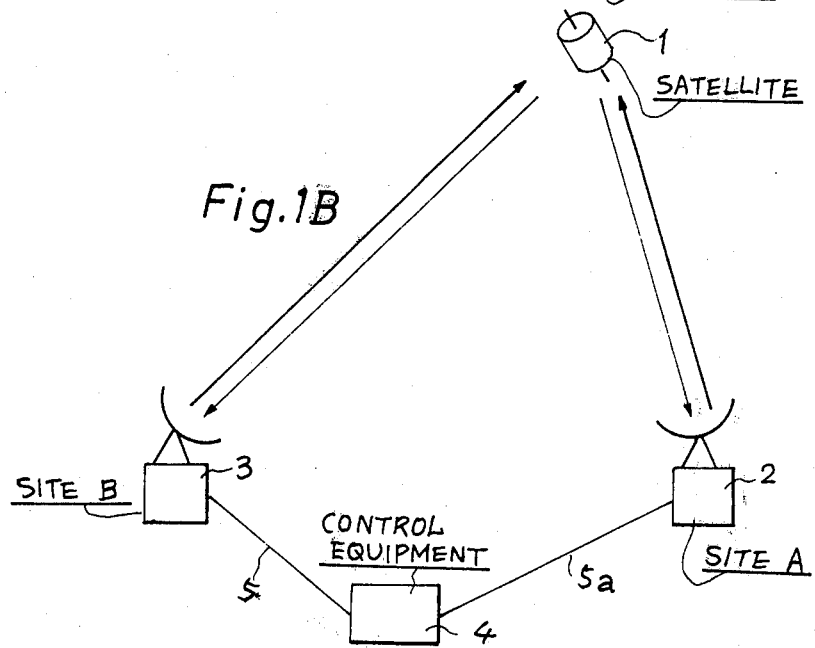

FIG. 1A is a view of a space diversity system including two sites to which this invention is applied. Numeral 1 denotes a communication satellite, and numerals 2 and 3 are signal transmission-reception sites which are connected with each other by a connection link 5 and spaced a distance $d$ from each other. Reference numeral 4 denotes a control equipment for selecting one of two signal route respectively including the sites 2 and 3 in accordance with the signal receiving condition in each of them. Input and output of PCM-TDMA signals to the space diversity system are completed through the control equipment 4. The control equipment 4 may be separately provided from the site A as shown in FIG. 1B, in which the site A and the control equipment 4 are connected by a connection link 5a to each other. In the following, the construction shown in FIG. 1A will mainly be described.

FIG. 2 shows an example of the space diversity system for PCM-TDMA telecommunications according to the present invention. In this example, 6 and 6a are each transmitting and receiving large antennas, 7 and 7a are usual transmitters, and 8 and 8a receivers each of which selects and amplifiers a desired signal. Reference numerals 9 and 9a are each a phase modulator of a PCM base band signal, 10 and 10a are demodulators each for obtaining a PCM base band signal by demodulating a received PSK-PCM signal, and 11 and 11a are each a signal conversion circuit (or a dejitterizer as will be called hereinafter) for converting the received PCM base band burst signal to a PCM base band burst signal synchronized with clock pulses of the same station. Reference numerals 12 and 12a are fixed digital delay circuits each comprising a shift register or a buffer memory. Reference numerals 13 and 13a are variable digital delay circuits each comprising a shift register of a small delay time. Reference numerals 14 and 15 are each a burst synchronization circuit usually employed in PCM-TDMA, which performs the transmission burst synchronization using synchronization signals (unique words) included in the received signal, and, as for signal reception, sends the unique word detection timing to a TDMA reception terminal, thereby decoding the received PCM signal. A reference numeral 16 is a phase difference detection circuit, which compares phase positions of special signals (e.g., unique words) from the burst synchronization circuits 14 and 15 and produces control signals for controlling the variable delay circuits 13 and 13a. Reference numerals 17 and 18 denote a receiving TDMA terminal equipment and a sending TDMA terminal equipment, respectively, and 19 and 20 show respectively a switch circuit for selecting received signals and a switch circuit of a sentout signal and its frame timing. Numeral 21 is a switchover decision circuit which uses the error rate of the received PCM signal noise included therein as informations for determining the switchover. A part surrounded by a chain line 22 corresponds to the control equipment in FIGS. 1A and 1B. Numeral 23 shows links (e.g, microwave links) connecting the control equipment 22 with the antenna site B which is located 10 km or more away from the former. To meet with the construction shown in FIG. 1B, links will be provided between the transmitter 7 and the modulator 9 and between the receiver 8 and the demodulator 10.

Now, the operational aspect of this invention will be described. When a signal from the communication satellite 1 passes through the routes A and B, which are located a distance $d$ from each other as shown in FIG. 1A, and is received at the control equipment 4, there will be reception time difference between the signal via the route A and that via the route B. It is apparent that this difference is generally the sum of the signal transmission time on the connection link 5 and the transmission time difference due to the length difference between the distance from the satellite 1 to the antenna site A station and from that to the antenna site B. If the satellite 1 is completely stationary in relation with both sites A and B, this difference is constant. But, it is technically impossible to completely fix the satellite relative to these sites A and B. Actually, the satellite 1 is orbiting around the earth in the same cycle of about 24 hours as the rotation of the earth and with some obliquity (under 0.5° as usual) against the equator. It is well known that, as the result, the movement of the satellite 1, when viewed from a point on the earth, forms a locus in the shape of numeral 8 at every 24 hours.

By this reason, the difference of signal reception times between the sites A and B varies $\Delta tx$ every half day in addition to the fixed time difference as mentioned above. In general, the $\Delta tx$ has a relation to the position of two sites on the earth, and to the distance $d$ between them, but is very small, e.g., 200 ~ 300 meters or less when $d$ is less than a length of 50 ~ 60 km.

Referring to FIG. 2, it is assumed that the site A is now the acting site under the communicating condition, and the control equipment is directly attached to the site A as in FIG. 1A, although the control equipment may be installed at an intermediary position between the sites A and B as shown in FIG. 1B. Signals received by the antenna 6 of site A are applied to the receiver 8, in which they are filtered and desired signal waves are selected and applied to the demodulator 10. In this demodulator 10, a PSKPCM signal of burst mode is demodulated into a PCM base band signal of burst mode. In this demodulation, clock timing included in the PCM base band signal of burst mode is extracted and used to regenerate a PCM signal. For this purpose, a signal for quickly regenerating the clock timing and also a certain pattern signal (called a unique word) for detecting burst synchronization timing are inserted into the head or leading part of each burst.

Figure 3:
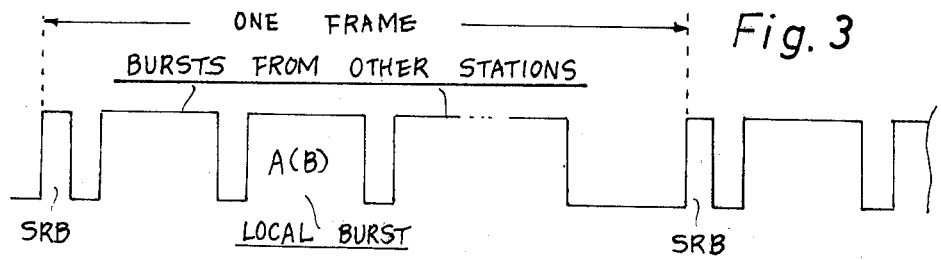
FIG. 3 is a signal configuration of a received signal train of burst mode in a communication system to which this invention is applied.
Figure 4:
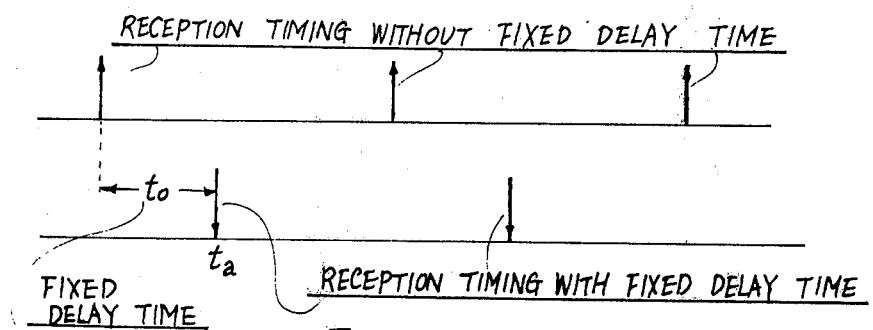
FIGS. 4 and 5 are time charts explanatory of the operation of this invention.

FIG. 3 is a schematic view of a received signal of burst mode, wherein clock frequencies of respective bursts are not completely coincident with each other and has frequency deviations in the range of $10^{-7} \sim 10^{-8}$. A signal SRB in FIG. 3 is a standard burst signal for synchronization. In usual PCM-TDMA telecommunication system, a number of burst signals are arranged in one frame on the basis of the position of this signal SRB so that they may not be overlapped with each other. The signal SRB is thus employed for timing control of burst sending so that bursts of the same station may be located in the predetermined place. This is the transmisson burst synchronization.

The received signal demodulated by the demodulator 10 is sent to the dejitterizer 11. The purpose of this circuit 11 is to produce such a received PCM signal synchronized with consecutive clock pulses, which repetition frrequency is approximately equal to that of the receiving clock timing prepared by the same station, since clock timings of respective received burst signals are a little different from one another. One example of this dejitterizer will be described hereinafter. In this case, if there is no interruption between adjacent bursts in the regenerated clock pulses at the output of the demodulator 10, this interruption may be made, as shown by dotted arrows in FIG. 2, by the control signal generated by the detection timing in the burst synchronization circuit 14 (and 15). Consequently, a PCM signal obtained at the output of the circuit 11 is synchronized with consecutive clock pulses of the same station, and can thereafter be treated as a continuous PCM signal. The signal treatment using continuous clock pulses of the same station thus becomes possible, and the fixed delay circuit 12 (12a) and the variable delay circuit 13 (13a) can be readily constructed. At the output of this dejitterizer 11, a length difference between fixed signal routes A and B is corrected by the fixed delay circuit 12a, which can easily be formed by a buffer memory or a shift register since the received signal of burst mode has been synchronized with clock pulses of the same station. When it is, for example, constructed by a shift register of $n$ steps, a delay of $n \times m$ (seconds) is obtained if intervals of clock pulses are equal to $m$ (seconds). In the buffer memory, it is enough to delay the read timing by a necessary time period from the write timing.

Since the received PCM signal of burst mode equivalently becomes a continous PCM signal, the above delay circuits 12, 12a, 13, 13a can be realized, and, dejitterizer 11 is needed for this process. By the way, in setting up the delay time in each delay circuit 12 or 12a, it is necessary to measure in advance delay times arising in the transmission and reception paths, and to establish the fixed delay time so as to compensate for that delay time. The output of delay circuit 12a is applied to the receiving TDMA terminal equipment 17 through the switch 19 and the burst synchronization circuit 14.

On the other hand, a received signal in the site B is applied to the switch 19 and the burst synchronization circuit 15 through the dejitterizer 11a and the variable delay circuit 13a. Burst synchronization circuits 14 and 15 detect the unique word from the received burst signal of burst mode. This detected timing is synchronized with the pulse train at the output of the dejitterizers 11 and 11 a in this invention and applied to the receiving TDMA terminal equipment 17 through the switch 19 for the purpose of giving the timing signal needed when the PCM received signal of burst mode is decoded into analog signals at the termimal equipment 17. At the same time, the burst synchronization circuits 14 and 15 add a certain signal detecting timing in one frame, e.g., an SRB detection timing, to the phase difference detection circuit 16, which decides whether SRB detection timing of the site A is advanced or delayed with reference to that in the site B. The decision is usually performed digitally with accuracy of 1 bit, and variable delay circuits 13 and 13a are controlled by this decision output.

Figure 5:
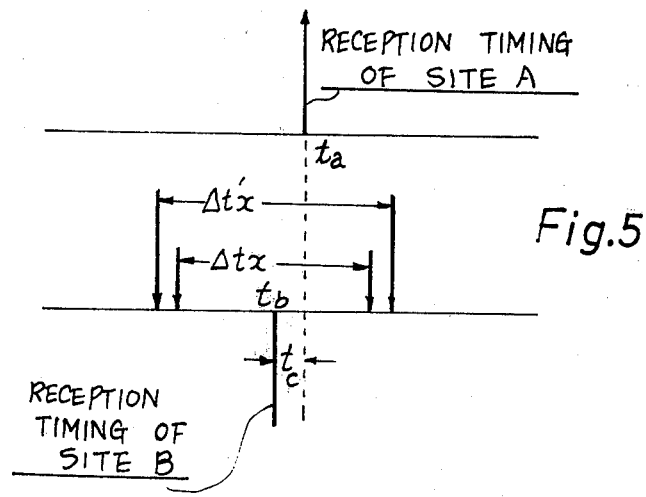

An example of the aforementioned operation will be described in the following with reference to FIG. 5. The fixed delay circuit is provided in the site A, the reception timings of the sites A and B are substantially the same as each other. Now, if it is assumed that the SRB detection timing is the time ta in the site A and the time tb in the site B, the detection circuit 16 will detect that the time tb is earlier than tA, so that the variable delay times in the variable delay circuits 13 and 13a is increased by a time tc. As the result, the output of the phase detection circuit 16 will become zero, and the length of electrical passage path in the site A will be completely equalized to that in the site B. An amount $\Delta tx$ in FIG. 5 is a deviation in the difference between signal receiving times of the sites A and B arising due to the satellite moving in the shape of numeral "8", and preparation of such a variable delay time as to correct this difference will permit to make equal any path length to each other in all cases. But, since exact estimation of the difference $\Delta tx$ is actually difficult, the variable delay time has been set up to a value $\Delta tx'$ including an additional delay time $\alpha$. The delay times of the variable delay circuits 13 and 13a are far smaller than those of the fixed delay times of the fixed delay circuits 12 and 12a, the variable delay circuits 13 and 13a are easily realized by the use of a shift register which is provided with an output terminal at each step. For instance, when the bit rate is 30 Mega/bit-/second in the two-phase phase-modulated wave the length of signal per 1 bit is about 33 nanoseconds. If a maximum difference in the path length ($\Delta tx \times$ the velocity of light) is equal to 300 meters, the transmission time is one nano-second, and steps of the shift register to be used is 1 (n.sec.)/33(n.sec.) $\approx$ 30. Practically, a little amount of allowance may be addded for determining the number of steps of the shift register. The delay time can easily be changed through selection of output taps.

In this case, it is noted that control of the delay times in the variable delay circuits 13 and 13 a must be done at the time of no signal between adjacent bursts, since, in a case where delay times in variable delay circuits 13 and 13 a are varied at the site B which is actually used, lack or duplication of one bit of information takes place if the control is performed when signals are handled in the variable delay circuits 13 and 13a. The control timings are usually different from each other at transmission and reception sites. As is well known, bursts of respective stations are located at predetermined positions in one frame in the PCM-TDMS systems. Accordingly, it is easy to estimate the termination timing of a burst from the unique word or the SRB detection timing, and the burst synchronization circuits 14 and 15 themselves have this estimating function in order to perform burst synchronization. The delay time control in variable delay circuits 13 and 13a can thus be easy at the no signal time between adjacent two bursts. As a result, the delay times in the variable delay circuits 13 and 13a are digitally controlled so that the electrical path length of the routes A and B are equal to each other, and the received signals of both routes A and B are fully synchronized with each other at the switching circuit 19, and no inconvenience will arise by the switchover of signal transmission routes.

On the other hand, the transmission timing of the sending side is automatically controlled by the burst synchronization circuit 14 in the site A, which is now in an actually communicating condition, and applied to the sending TDMA terminal station 18 through the switch circuit 20. But, since the fixed delay circuits 12 and 12a and the variable delay circuits 13 and 13a adjust so as to equalize the electrical path lengths of sites A and B to each other, transmission timings generated at the burst synchronization circuits 14 and 15 must be exactly equal with each other. Accordingly, since the same transmission timing is always prepared at the site B (stand-by route), a transmission timing currently used at the site A is given to the burst synchronization circuit 15 in the site B which in turn prepares a stand-by transmisson timing being synchronized with the given timing, so that a desired transmission timing may be obtained immediately after the switchover.

Next, the route switchover will be explained. When the signal receiving condition of the route A, which is shown as an actually communicating route in FIG. 2, is more deteriorated than that of the route B by rainfall, etc., the actually communicating route is naturally switched over to the transmissionreception route B to utilize the diversity function. In this case, the change of transmission routes is performed at the time of no signal when no burst is existing, just like the control of the variable delay circuits 13 and 13a. At the reception side, however, this is possible at any time, since the received signals at both routes A and B are, as mentioned before, synchronized with each other if the output of the phase difference detection circuit 16 is zero. But this change is needed to be done after control of the variable delay circuits 13 and 13a, when there is a diffference between delay times of the routes A and B, that is, when the phase difference between detection circuit 16 is detecting a phase difference. The above mentioned dejitterizer 11 or 11b can be formed by means for detecting the presence of clock pulses of burst mode recovered by the demodulator 10 or 10a, and means for temporarily storing a baseband digital signal of burst mode demodulated by the demodulator 10 or 10a in an elastic memory until said signal is read out at a timing synchronized with the repetition frequency of continuous clock pulses. By these means, a series of burst digital signals having slightly difference clock frequencies is converted into a signal series synchronized with said continuous clock. The proposed circuit does not require any significant information included in the received signal of burst mode (for example, time slot information, station identification code to identify the transmission source of the received signal of burst mode).

Figures 6, 8:
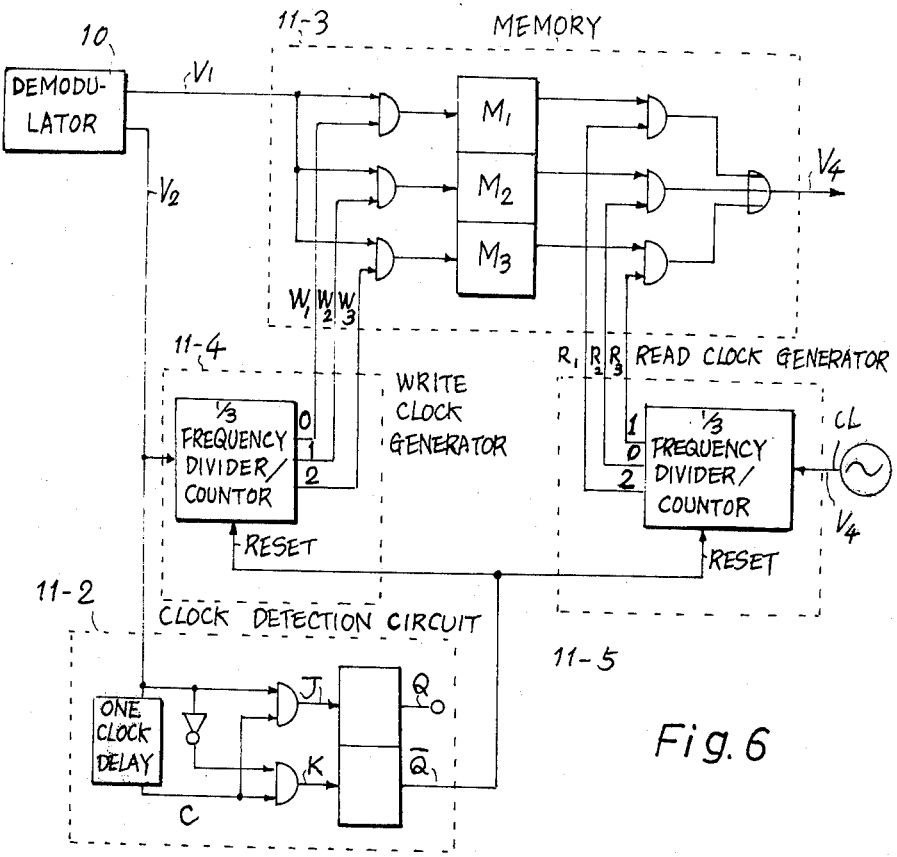
FIG. 6 is a block diagram illustrating an example of a dejitterizer employed in this invention.
FIG. 8 is a table explanatory of the operation of the dejitterizer shown in FIG. 6.
Figure 7:
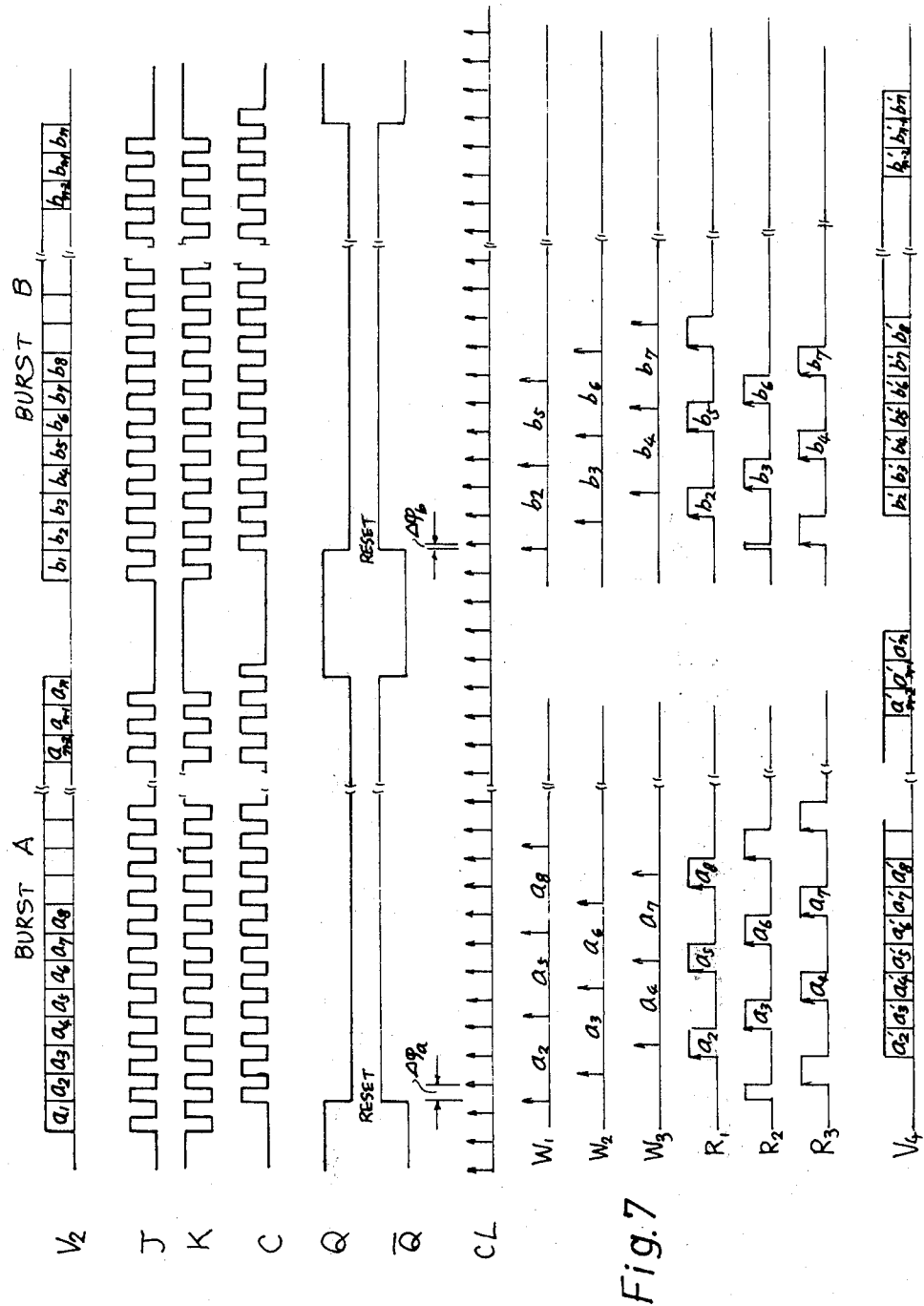
FIG. 7 shows time charts explanatory of the operation of the dejitterizer shown in FIG. 6.

An embodiment of the dejitterizer 11 (or 11a) is shown in FIG. 6. FIG. 7 shows time charts explanatory of the functions of circuits in FIG. 6. In FIG. 6, the presence of recovered clock pulses in the burst signal supplied by the demodulator 10 is detected by a clock detection circuit 11-2. The recovered clock and its inverted clock pulses are supplied to J and K inputs of a J-K flip-flop, and the recovered clock pulses delayed by one clock period plus $\alpha$ (for phase adjustment) is supplied to a clock input C of the J-K flip-flop. With logics shown in FIG. 8, the J-K flip-flop produces Q and $\overline{Q}$ outputs as shown in FIG. 7. A memory 11-3 temporarily stores the burst digital signal series supplied from the democulator 10. A write clock generator 11-4 generates, under the control of the clock detection circuit 11-2, parallel clock pulses (W1, W2 and W3) to write the input digital signal into the memory 11-3. The parallel clock pulses are synchronized with the recovered clock pulses. A read clock generator 11-5 generates, under the control of the clock detection circuit 11-2, parallel clock pulses (R1, R2 and R3) synchronized with continuous clock pulses CL to read data stored in the memory 11-3 in the form of a series signal synchronized with the continuous clock pulses CL. In the write clock generator 11-4, a ⅓ frequency divider/counter is reset by the output Q of the clock detection circuit 11-2. By counting the recovered burst clock pulses from the demodulator 10, three parallel write clock pulses (W1, W2 and W3; the state "1" output for W1, the state "2" output for W2, and the state "3" output for W3) is generated. Similarly, in the read clock generator 11-5, a ⅓ frequency divider/counter is reset by the output $\overline{Q}$ of the clock detection circuit 11-2, and three-parallel read clock pulses (R1, R2 and R3; R1 for the state "3" output, R2 for the state "1" output, and R3 for the state "2" output) by counting the continuous clock pulses.

Capacity of the memory 11-3 must be determined to protect the temporarily stored data from erroneous reading, such as dropout or double-read due to overlapping of write and read cycles. In this description, a three-bit capacity is given to the memory 11-3, considering (1) the maximum phase difference between the recovered clock pulses and the continuous clock pulses is one bit, (2) a repetition frequency difference between the continuous clock pulses and the recovered clock pulses is very small in TDMA system, and (3) as will be described later, counters in the write clock generator and the read clock generator are reset at every burst, ordinarily.

Received burst A is converted into a baseband signal by the demodulator 10 which produces a digital signal series of burst mode {ai} and burst clocks pulses, as shown in FIG. 7. When the recovered burst clock pulses are supplied to the clock detection circuit 2, the circuit 2 senses the presence of the clock pulses and generates the output $\overline{Q}$, which is applied to the write clock generator 11-4 and resets the ⅓ frequency divider/counter to an initial condition (W1, W2, W3) = (1, 0, 0 ). Thus, the counter starts counting the recovered burst clock pulses, and generates three-parallel clock pulses (W1, W2, W3) which sequentially write digital signals into memory cells M1, M2 and M3. On the other hand, the output $\overline{Q}$ also resets the ⅓ frequency divider to an initial condition (R1, R2 and R3) = (0, 1, 0). Thus, the counter starts to count the continuous clock pulses and generates three-parallel read clock pulses (R1, R2, R3) as shown in FIG's 6 and 7, so that these clock pulses will read the recovered digital signals stored in the memories M1, M2 and M3, respectively.

According to the series of operation, the demodulated digital signal $\{a_i\}$ is converted into a signal series $\{a_i'\}$ synchronized with the continuous clock pulses CL which are nonsynchronous to the digital signal $\{a_i\}$. Burst B is also processed similarly, and the demodulated digital signal $\{b_i\}$ is converted into a signal series $\{b_i'\}$ which is synchronized with the continuous clock pulses.

In FIG. 7, $a_1$ and $b_1$ in the demodulated digital signal series $\{a_i\}$ and $\{b_i\}$ are dropped out from the signal series $\{a_i'\}$ and $\{b_i'\}$. However, in the burst configuration of TDMA system, a carrier and clock recovery codes for FSK demodulation is assigned at the top of each burst. Therefore, the drop-out of $a_1$ and $b_1$ gives no influence to burst synchornization, demultiplexing and other operations in the digital TDMA terminal, which are done by the use of the converted signal series. Amounts $\Delta\phi$ a and $\Delta\phi$ b in FIg. 7 represent phase differences between clocks of signal series included in burst A and burst B, and the continuous clock respectively.

In accordance with this invention mentioned above, route switching in a space diversity system of PCM-TDMA telecommunication becomes possible under synchronization with clock pulses of the burst signal trains of routes A and B, and a so-called "error-free switching" with no error incurred by the switching can be readily and reliably achieved.

What we claim is:

1. A space diversity system with at least two signal routes in a PCM-TDMA telecommunication system utilizing a communication satellite generally stationary with respect to ground stations of the system, comprising;

signal conversion circuits each inserted in the receiving side of a respective one of said at least two signal routes for converting the received PCM signals of burst mode at each route into PCM signals synchronized with consecutive clock pulses of a respective ground station for each route, phase difference detection means connected to said signal conversion circuits for establishing an arrival time difference between said PCM signals of said routes, fixed delay circuits inserted in at least one of said signal routes for correcting a fixed delay difference between said routes, variable delay circuits inserted in at least a remaining one of said signal routes and responsive to the output of said phase difference detection means for correcting the deviation of said arrival time difference between said PCM signals of said routes which occurs in accordance with any movement of said satellite, thereby equalizing respective electrical lengths of said routes to one another; and switchover means connected to said signal routes for selecting one of said signal routes in accordance with the quality of the signals received at each route.

2. A space diversity system according to claim 1, in which said signal conversion circuits each comprise a clock detection circuit to detect the presence of recovered burst clock pulses from the received PCM signals of burst mode, a write clock generator to generate write clock pulses, synchronized with said regenerated burst clock pulses, when said clock detection circuit detects said recovered clock pulses, a memory to temporarily store said received PCM signal series under the control of said write clock pulses, a continuous clock pulse generator to generate continuous clock pulses of a repetition frequency approximately equal to the repetition frequency of said recovered burst clock pulses, a read clock generator to generate read clock pulses synchronized with said continuous clock pulses when said clock detection circuit detects said recovered clock pulses, and a memory read circuit to read data stored in said memory under the control of said read clock pulses, whereby said received PCM signal series of burst mode can be converted to an output signal series synchronized with said continuous clock pulses.

3. In a space diversity satellite PCM-TDMA telecommunication system of the type including at least a pair of ground antennas located at separate sites and a satellite generally stationary with respect to the ground antennas, each of the ground antennas and the satellite defining therebetween a respective space signal channel through which signals are transmitted between the satellite and the ground antennas, the satellite including a transmitter for transmitting PCM signals in a burst mode to the ground antennas, and at least two receivers each connected to a respective one of the ground antennas for receiving signals transmitted from the satellite, the improvement which comprises:

- a respective signal conversion means connected to each of the receivers for converting received PCM burst mode signals, transmitted from the satellite through the respective space channels, into synchronized PCM signals synchronized with respective clock pulse trains;
- phase difference detecting means connected to receive the respective synchronized PCM signals from the respective signal conversion means for developing phase difference signals representative of phase differences between the respective synchronized PCM signals and which phase differences are representative of the difference between the arrival times of PCM signals transmitted from the satellite and received at respective ones of the ground receiving antennas;
- first delay means connected to receive the respective synchronized PCM signals from one of said signal conversion means for delaying the respective synchronized PCM signals by a fixed delay equal to a fixed delay in arrival time of the PCM burst mode signals, transmitted from the satellite through the space transmission channel corresponding to said one of said signal conversion means, after the arrival time of the PCM burst mode signals transmitted from the satellite through the space transmission channel corresponding to the other of said signal conversion means, thereby to correct the fixed delay;
- second delay means connected to receive the respective synchronized PCM signals from the other one of said signal conversion means, and responsive to the output of said phase difference detecting means for delaying the synchronized PCM signals in dependence on the phase difference signals for correcting a variation of the arrival time difference between the arrival times of the PCM burst mode signals received at the ground station antennas which occurs in response to motion of the satellite relative to the ground antennas; and
- signal selecting means, connected to receive the delayed synchronized PCM signals developed by said first delay means corresponding to one of the space channels and connected to receive the delayed synchronized PCM signals developed by said second delay means corresponding to the other of the space channels, and operable for selecting one of the delayed synchronized PCM signals in accordance with the signal quality of the PCM signals transmitted through the respective space signal channels.

* * * * *